United States Patent
Khlifi

(10) Patent No.: US 10,532,770 B2
(45) Date of Patent: Jan. 14, 2020

(54) METHOD FOR OPERATING A DRIVER ASSISTANCE SYSTEM OF A MOTOR VEHICLE AND MOTOR VEHICLE

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/084,370

(22) PCT Filed: Mar. 10, 2017

(86) PCT No.: PCT/EP2017/055660
§ 371 (c)(1),
(2) Date: Oct. 3, 2018

(87) PCT Pub. No.: WO2017/157787
PCT Pub. Date: Sep. 21, 2017

(65) Prior Publication Data
US 2019/0077458 A1    Mar. 14, 2019

(30) Foreign Application Priority Data
Mar. 17, 2016    (DE) .................. 10 2016 003 308

(51) Int. Cl.
*B62D 15/02*    (2006.01)
*G01S 13/89*    (2006.01)
*G01S 13/93*    (2006.01)

(52) U.S. Cl.
CPC ..... *B62D 15/0265* (2013.01); *B62D 15/0275* (2013.01); *G01S 13/89* (2013.01);
(Continued)

(58) Field of Classification Search
CPC .............. B62D 15/025; B62D 15/0265; B62D 15/027; B62D 15/0275; G01S 13/89;
(Continued)

(56) References Cited

U.S. PATENT DOCUMENTS 7,664,600 B2 *  2/2010  Takeichi ............. G01S 7/52004
                                                       340/435
8,245,270 B2 *  8/2012  Cooperstein ........... G06F 21/53
                                                       709/203
(Continued)

FOREIGN PATENT DOCUMENTS

DE    102012222972 A1    6/2014
DE    102014013219 A1    4/2015
(Continued)

OTHER PUBLICATIONS

International Search Report and Written Opinion directed to related International Patent Application No. PCT/EP2017/055660, dated Jun. 6, 2017, with attached English-language translation; 23 pages.

(Continued)

*Primary Examiner* — Babar Sarwar
(74) *Attorney, Agent, or Firm* — Sterne, Kessler, Goldstein & Fox P.L.L.C.

(57) ABSTRACT

Systems and methods for operating a driver assistance system of a motor vehicle are provided, wherein the motor vehicle has at least one radar sensor which captures the environment of the motor vehicle. The radar sensor data is evaluated to form an environmental model describing the environment of the motor vehicle. If at least one query criterion is satisfied, an environmental map derived from the environmental model, and illustrating a top view of regions which can and cannot be travelled on is displayed on the display device. During an interaction between the driver and the displayed environmental map, trajectory data describing a desired trajectory of the driver is determined, and the motor vehicle is at least partially automatically guided along a real trajectory derived from the trajectory data.

10 Claims, 3 Drawing Sheets

Figure 3:
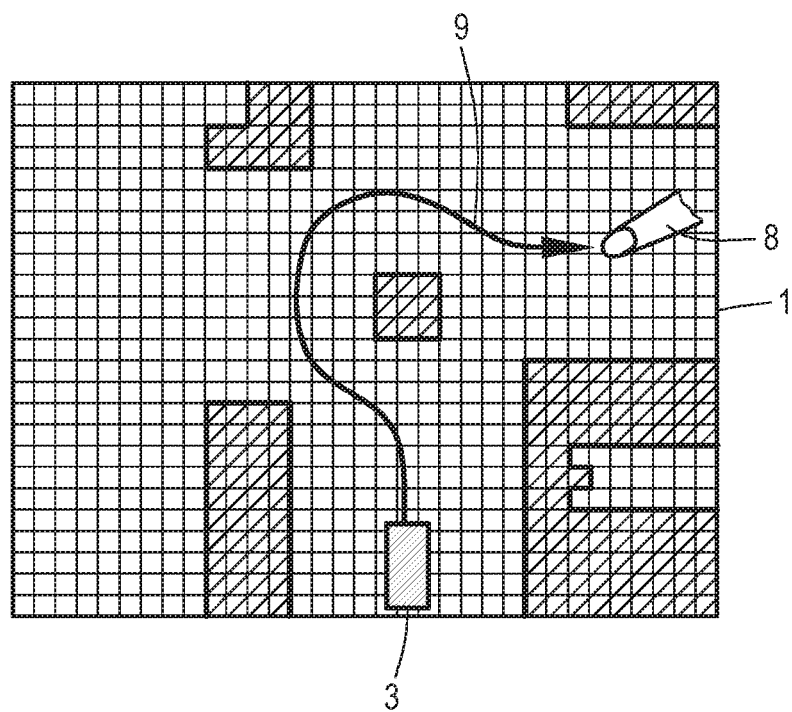

(52) U.S. Cl.
CPC ..... *G01S 13/931* (2013.01); *G01S 2013/9314* (2013.01); *G01S 2013/9375* (2013.01); *G01S 2013/9378* (2013.01); *G01S 2013/9385* (2013.01)

(58) Field of Classification Search
CPC ........... G01S 13/931; G01S 2013/9314; G01S 2013/9375; G01S 2013/9378; G01S 2013/9385
See application file for complete search history.

(56) References Cited

U.S. PATENT DOCUMENTS

| | | | | |
|---|---|---|---|---|
| 8,676,488 | B2 * | 3/2014 | Nagata | B60W 50/06 340/435 |
| 9,500,497 | B2 * | 11/2016 | Lavoie | G01C 21/3676 |
| 9,753,459 | B2 * | 9/2017 | Mueller | G05D 1/0088 |
| 2009/0265061 | A1 * | 10/2009 | Watanabe | G08G 1/165 701/36 |
| 2012/0065841 | A1 * | 3/2012 | Nagata | B60W 50/06 701/36 |
| 2013/0158863 | A1 * | 6/2013 | Skvarce | G08G 1/168 701/428 |
| 2014/0358424 | A1 * | 12/2014 | Lavoie | G01C 21/3676 701/428 |

FOREIGN PATENT DOCUMENTS

| | | | |
|---|---|---|---|
| DE | 102013223417 | A1 | 6/2015 |
| DE | 102014206901 | A1 | 10/2015 |
| EP | 2439714 | A1 | 3/2015 |

OTHER PUBLICATIONS

Jri Lee et al., "A Fully Integrated 77-GHz FMCW Radar Transceiver in 65-nm CMOS Technology", IEEE Journal of Solid State Circuits 45 (2010), S. 2746-2755.
English-language abstract of German Patent Application Publication No. 102012222972 A1, published on Jun. 12, 2014; 2 pages.
English-language abstract of German Patent Application Publication No. 102014013219 A1, published on Apr. 2, 2015; 6 pages.
English-language abstract of German Patent Application Publication No. 102013223417 A1, published on Jun. 25, 2015; 6 pages.
English-language abstract of German Patent Application Publication No. 102014206901 A1, published on Oct. 15, 2015; 6 pages.
International Preliminary Report on Patentability directed to related International Patent Application No. PCT/EP2017/055660, dated Jun. 12, 2018, with attached English-language translation; 19 pages.

* cited by examiner

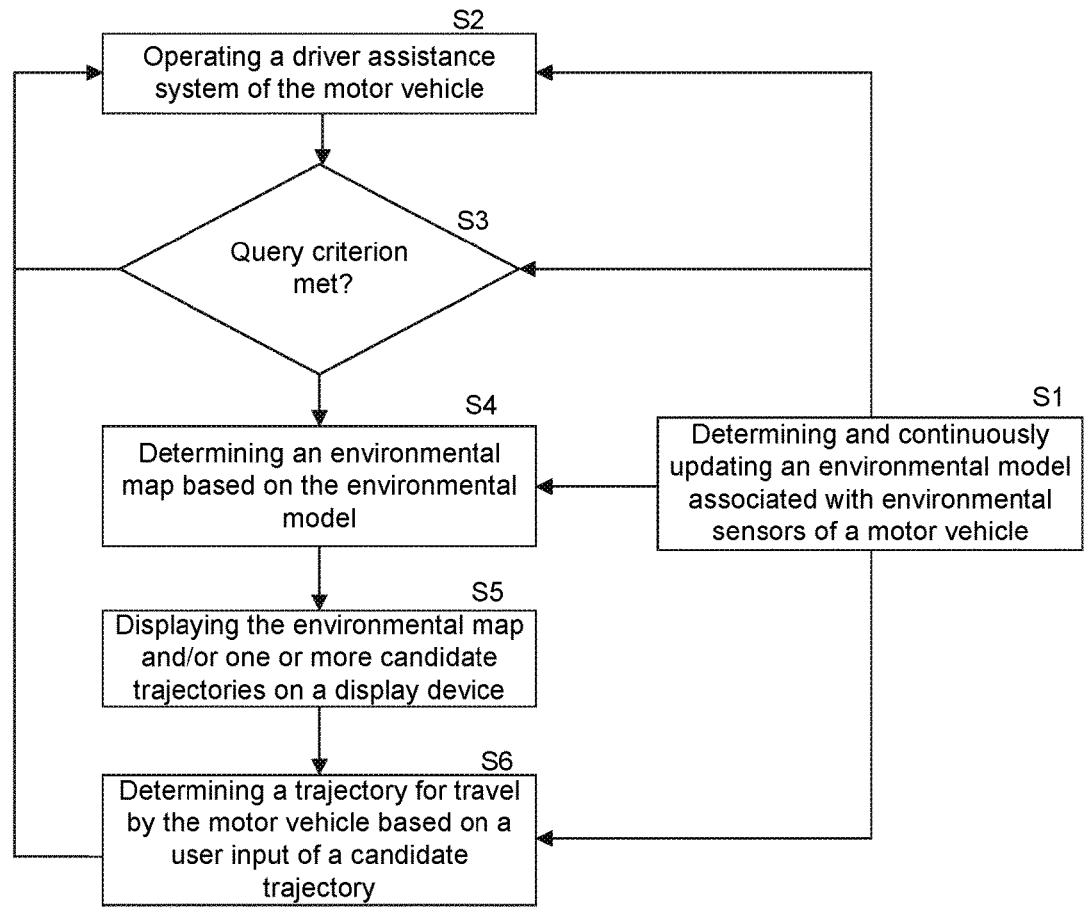
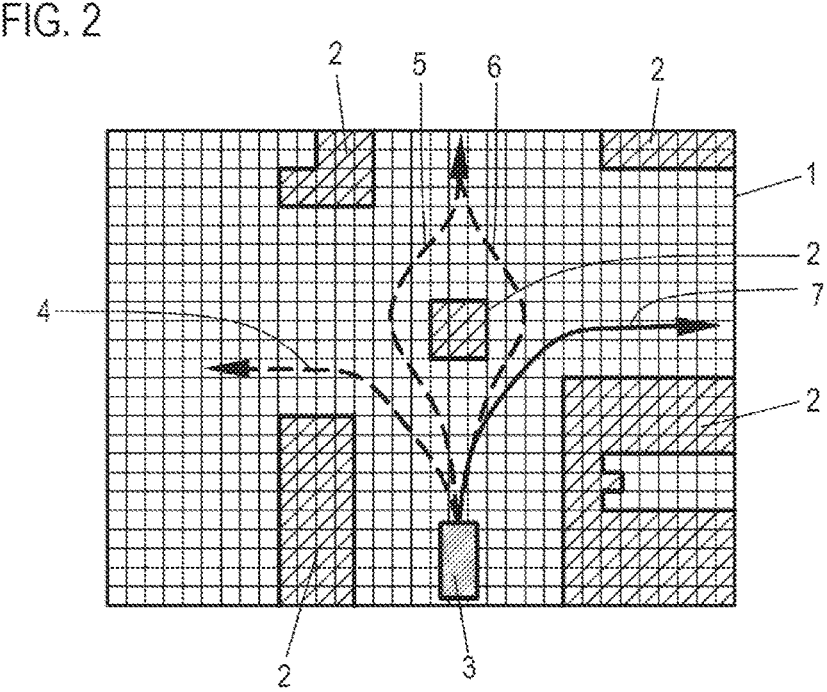

METHOD FOR OPERATING A DRIVER ASSISTANCE SYSTEM OF A MOTOR VEHICLE AND MOTOR VEHICLE

TECHNICAL FIELD

The present disclosure relates to a method for operating a driver assistance system of a motor vehicle, wherein the driver assistance system is designed to at least partially automatically guide the motor vehicle, and the motor vehicle has as least one radar sensor as an environment sensor which captures the environment of the motor vehicle and the sensor data from which are evaluated to form an environmental model describing the environment of the motor vehicle. In addition, the present disclosure relates to a motor vehicle.

BACKGROUND

Autonomous driving features on modern motor vehicles, (e.g., the at least partially automated guiding of motor vehicles), require a high-quality environmental perception of the corresponding environment sensors of the motor vehicle. One essential, frequently used environment sensor in motor vehicles is the radar sensor.

The use of radar sensors in motor vehicles has become commonplace in autonomous driving. Radar sensors today are used, first and foremost, as environment sensors for the medium and larger distance ranges for detecting other traffic participants or major objects located at a distance, angle or relative speed. Such radar data can be incorporated in environmental models or made available directly in motor vehicle systems. Conventional applications of radar data with respect to autonomous driving include, for example, longitudinal control systems, such as adaptive cruise control (ACC) or safety systems.

Conventional radar sensor models are most often expansive and therefore rather clunky after the antennas and the electronic components needed on the antenna, which is the radar front end, have been integrated inside a housing. The electronic components therein mainly constitute the radar transceiver that contains a frequency control (typically comprising a phase lock loop—PLL), mixing means, a low noise amplifier (LNA), and the like; but control modules and digital signal processing components are often also implemented in the proximity of the antenna, for example, in order to be able to hand off already processed sensor data, such as, for example, object lists, to a connected bus, for example, a controller area network (CAN) bus.

The implementation of radar components on semiconductor basis proved difficult for a long time, because it required the use of expensive special semi-conductors, particularly gallium arsenide (GaAs). Smaller radar sensors were proposed, whose entire radar front end is implemented on a single chip utilizing silicon-germanium (SiGe) technology, before solutions utilizing complementary metal-oxide-semiconductor (CMOS) technology became known as well. Such solutions are the result of the extension of CMOS technology to high-frequency applications often also referred to as radio frequency (RF) CMOS. A CMOS radar chip of this kind is implemented in highly miniaturized form and does not utilize expensive special semi-conductors, wherefore it offers clear advantages over other semi-conductor technologies especially in manufacturing. An exemplary implementation of a 77 GHz radar transceiver as a CMOS chip has been described in the article by Jri Lee et al., "A Fully Integrated 77-GHz FMCW Radar Transceiver in 65-nm CMOS Technology," IEEE Journal of Solid State Circuits 45 (2010), pp. 2746-2755.

After proposing the implementation of the chip and the antenna in a joint package, an extremely cheap, small radar sensor has become possible that is noticeably better able to accommodate structural space requirements and that, due to the short signal paths, has a very low signal-to-noise ratio and is suitable for high frequencies and larger, variable frequency bandwidths. Such miniature radio sensors therefore also lend themselves for use in short-range applications, for example, in the range of 30 cm to 10 m.

It has also been proposed previously to provide such a CMOS transceiver chip and/or a package with CMOS transceiver chip and antenna on a common circuit board with a digital signal processing processor (DSP processor) or to integrate the features of the signal processing processor also in the CMOS transceiver chip. A similar integration is possible for control functions.

To provide an ideal foundation for the driver assistance system and the at least partially automated guiding of the motor vehicle, which, accordingly, is the at least partially automated transverse guidance and the at least partially automated longitudinal guidance, conventional techniques provide for merging the sensor data from a plurality of environment sensors, particularly also a plurality of radar sensors, and determining based thereupon an environmental model of the motor vehicle that usually refers to a field around the motor vehicle that is defined by the range of the environment sensors and that describes said field as a function of the type and quality of the sensor data of the environment sensors. Known are object-based environmental models where the environment is described by objects based on their relative positions vis-a-vis the motor vehicle and the object characteristics assigned to them or by environmental models that subdivide the fields they cover in individual cells and assign them a movement state and additional information (grid-based approach). Hybrid approaches situated between the two approaches are also conceivable and have been described previously. Based on such an environmental model, driver assistance systems that are designed for at least partially automated guidance of the motor vehicle can compute concrete longitudinal guidance and/or transverse guidance interventions, and/or they can compute entire trajectories in advance that any further operation by the motor vehicle utilizes to orient itself. It is understood that, even during the implementation of such a trajectory that was computed in advance, the continuously updated environmental model is analyzed to be able to actively react to changes, particularly including features for the avoidance of accidents and/or the mitigation of the consequences of an accident.

Driver assistance systems are frequently designed offering at least a partial configuration capacity, whereby it is possible, for example, for particular comfort features to be activated and deactivated, for warning and information threshold values to be selected by the driver, and/or for informational outputs to be adjustable in terms of how they are displayed, for example, by adjusting the brightness on an optical display and/or the volume on an acoustic display.

Particularly for driver assistance systems where a completely automated guidance of the motor vehicle is to be implemented, in which, accordingly, the driver is to be provided with the best possible support, there exist extremely complex traffic situations where the selection of the trajectory can be less than optimal, due to difficulties in the interpretation of the sensor data and/or of the environmental model and/or the detection properties of the environment sensors are inadequate, wherefore the best possible driver support cannot be implemented in the best possible manner.

BRIEF DESCRIPTION OF DRAWINGS/FIGURES

Figure 4:
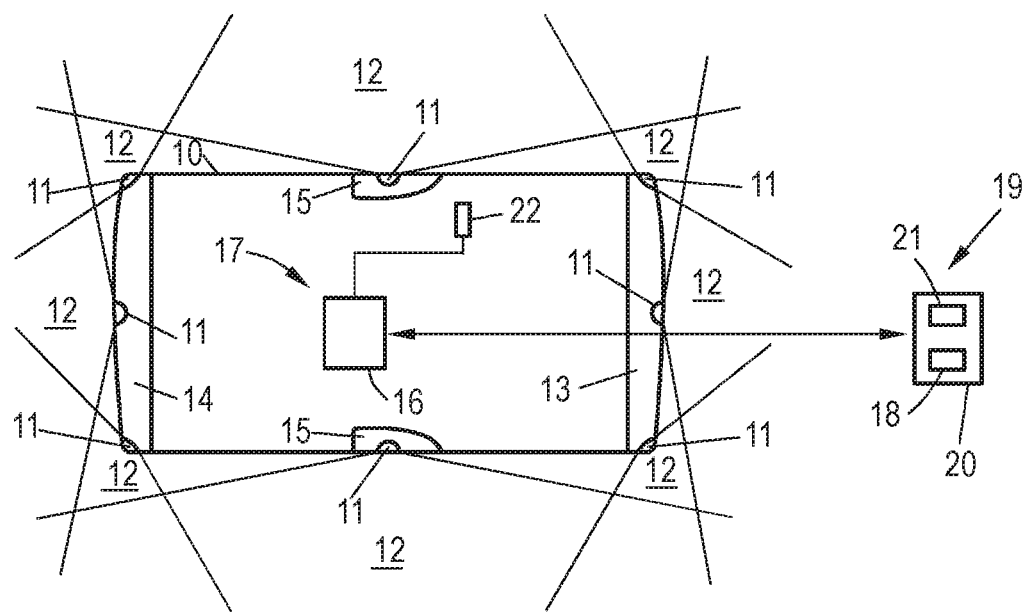
Figure 5:
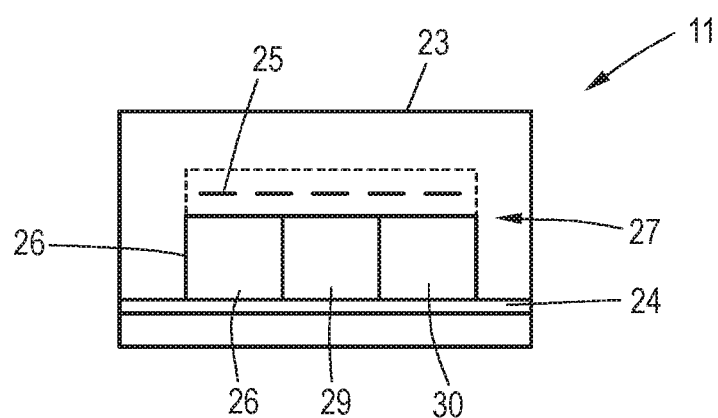

FIG. 1 shows a flow chart of an embodiment of the method according to embodiments of the present disclosure, FIG. 2 shows a first possible visualization of an environmental map according to embodiments of the present disclosure, FIG. 3 shows a second possible visualization of an environmental map according to embodiments of the present disclosure, FIG. 4 shows a motor vehicle according to embodiments of the present disclosure, and FIG. 5 shows a sketch illustrating the principle of a radar sensor according to embodiments of the present disclosure.

DETAILED DESCRIPTION

The object of embodiments of the present disclosure is to provide an option for operating a driver assistance system that, while using all the available detection resources, will allow for an improved determination of the trajectories for at least partially automated guidance of the motor vehicle.

To achieve this object, a method of the kind mentioned in the introduction envisions according to embodiments of the present disclosure that, if at least one query criterion is satisfied, an environmental map, which is derived from the environmental model and illustrates regions which can and cannot be travelled on according to a top view, is visualized for the driver of the motor vehicle on a display device, wherein, during an interaction between the driver and the displayed environmental map which is made possible by an operating device, trajectory data describing a desired trajectory of the driver are determined and the motor vehicle is at least partially automatically guided along a real trajectory derived from the trajectory data.

Accordingly, embodiments of the present disclosure are therefore based on the rationale that the driver is better able to perceive his environment than the environment sensor means, wherefore the driver's perceived information should also be considered. While it has been assumed to date that the driver assistance systems must support the driver and not vice versa, it is now being proposed that the driver's perception is to support said perception of the environment in particular, complex situations that cannot be completely resolved by the environmental sensor means. This means, accordingly, that the driver is actively involved in the driving action, and he is being offered selections to choose from that can influence the future real trajectory of the motor vehicle. To this end, in corresponding situations, the driver can input trajectory data describing a desired trajectory via a user interface that is constituted of a display device and an operating device, wherein the driver is shown an environmental map on the user interface as a particularly advantageous aid and for enabling intuitive linking of the environment and the visualization on the user interface, which is, accordingly, a visualization of the detected environment of the motor vehicle indicating regions that can and cannot be travelled on seen in a top view. Particularly in cases when a grid-based environmental model is used, which is a model that subdivides the environment in individual segments and can assign, aside from the occupation-related information, additional information to said segments, such an environmental map is easily generated. It is understood that such an environmental map can also include further, more precise information, wherein it is preferred, however, that the environmental map be kept abstract and intuitively detectable.

To this end, the environmental map preferably comprises a two-dimensional grid visualization that is shown in a top view of the regions that can and cannot be travelled subdivided in area segments, wherein area segments are visualized differently depending on the state of whether the region can be travelled or not; for example, area segments that cannot be travelled according to the environmental model are visualized in red, while area segments that can be travelled according to the environmental model are visualized in white. A further type of characterization of the area segments, for example, the color yellow, can optionally be assigned when the state of whether a region can be travelled or not is unknown, for example, when regions are hidden from the environment sensor means and possibly further data sources.

The query criterion therein describes the difficulties in the detection of the environment and/or the determination of the trajectories. This means that the driver is queried each time when it is not possible to describe a trajectory with the usual level of reliability based on an adequate detection of the environment and/or in traffic situations of a high level of complexity, which can be achieved, for example, based on a threshold value. The query criterion therein is preferably designed to limit the number of queries with the driver to a minimum number of instances, which is limited to a few situations when it is actually necessary, wherein it is understood that corresponding threshold values can also be influenced by the driver, which can be expedient particularly when the driver assistance system guides the vehicle completely automatically, because, if in doubt, the driver can focus on more frequent queries. The query criterion therein can be applied in three places; namely, at the location of the environmental sensor means per se (direct assessment of the detected environment), the environmental model (indirect assessment of the detected environment), and/or by via the trajectory determination by means of a trajectory determination unit, which often also returns confidence values and/or other information regarding the reliability of the determination of the trajectories. Concretely speaking, an embodiment of the present disclosure provides for the query criterion to evaluate the operating data that describe the operating state of the at least one environment sensor and/or the environmental model for the incomplete environmental detection relative to the determination of the trajectories and/or output data of a trajectory determination unit for an adequately reliable determination of the trajectories. As mentioned previously, different threshold values can be used to describe this situation, for example, confidence values, coverage values, quality values, error values, and the like.

An embodiment of the present disclosure uses a touchscreen as display device. The operating means is at least in part already integrated in such a display device in the form of a touch sensor means. A touchscreen enables a direct interaction with the environmental map that is visualized on the display thereof, wherefore it is possible, for example, that trajectories that have been computed in advance can be directly selected and/or modified; and, in an embodiment of the present disclosure, it is possible to visualize desired trajectories as well that can be drawn with a finger directly into the environmental map. To this end, the user moves his finger along a line on the touchscreen that corresponds to the path that is to be travelled, as motion that is often also referred to as a "stroke." The corresponding data from the touch sensor means then yield the data for the trajectories from which the desired trajectory can be derived. This way, the implementation of a particularly advantageous user interface is possible.

Embodiments of the present disclosure can provide for the use of components of a mobile device that is not a part of the motor vehicle as display device and operating device, particularly from a smartphone. Accordingly, the use of display devices that are intrinsic to the motor vehicle and/or of operating devices that are intrinsic to the motor vehicle is not necessary; instead, it is possible to use a mobile device that communicates with the motor vehicle, concretely with the driver assistance system, and that includes, particularly preferably, a touchscreen that is used as a display means and an operating means. In this, in addition to the advantageous use of a mobile device that is known to the driver and that can be intuitively operated by the driver, which improves flexibility, it is also conceivable for the user not to be present inside the vehicle at all, for example, during a parking and/or placement maneuver of the motor vehicle, during which the driver is located outside of the motor vehicle and still has the ability of supporting the vehicle but while keeping an eye on the motor vehicle's environment.

As mentioned previously, two basic embodiments for the concrete input of trajectory data are conceivable; and it is understood that these embodiments can be used cumulatively. On the one hand, a pre-computed selection of candidate trajectories is conceivable; on the other hand, the driver can enter a route by means of free hand signs that are entered as trajectory data by interacting with the environmental map.

Accordingly, an embodiment of the present disclosure envisions that a plurality of possible candidate trajectories are automatically determined and indicated to the driver as options to choose from in the environmental map. Such driver assistance systems, as mentioned previously, that enable at least partial automated guidance of a motor vehicle comprise most of the time at least one trajectory determination unit for determining and analyzing possible trajectories based on a given traffic situation, wherein the trajectory that is evaluated as the best trajectory is typically used as the real trajectory. But if the query criterion is met, a case applies where either the environmental detection and/or the determination of the trajectories has failed to achieve an adequate baseline quality; however, it is still possible to visualize, for example, a predetermined number of the trajectories, which have been evaluated as the best trajectories by the trajectory determination unit, and offering the same to be visualized as candidate trajectories in the environmental map from which the driver can make his selection.

In some embodiments of the present disclosure, it is particularly preferred when one representative candidate trajectory is selected for different possible driving maneuvers and/or routes, particularly as candidate trajectory that is optimized relative to security and/or comfort. Trajectories can be determined with a plurality of variations for comparable driving maneuvers and/or routes, for example, for two-point turns and turns in excess of two points, and/or for evading obstacles on the right side or on the left side. Accordingly, it is possible to classify different conceivable trajectories and to envision one representative candidate trajectory that is to be visualized for such classes of trajectories, particularly such that have already been optimized in terms of safety and/or comfort, wherefore and providing there are no changes in the environment of the motor vehicle, they can be used directly as given real trajectory. In particular, as mentioned previously, the trajectory determination unit can be configured such that it only offers those trajectories from among the trajectories that have been evaluated as being the best trajectories and that are representative for a class of trajectories that is defined by a driving maneuver and/or a route.

In embodiments of the present disclosure, a criticality value can be determined for each candidate trajectory that describes the criticality of driving the trajectory, wherein the display of the candidate trajectories is a function of the criticality value, particularly by its coloring according to the criticality value. Specifically, when the trajectories are also optimized for safety, they can be assigned a criticality value that usually indicates the remaining small residual risk of difficulties when driving the corresponding trajectory. This level of difficulty of the individual candidate trajectories can now also be visualized for the driver, wherein, for example, different color codes can be used. In particular, it can be envisioned that the criticality value may additionally include a detection value that has been determined in the context of the query criterion, which ultimately describes how severely the corresponding candidate trajectory is affected by the problems relative to the environmental detection and/or the determination of the trajectories. For example, whether the candidate trajectory touches on undetected sub-regions of the environment and/or traverses such sub-regions, and/or whether the candidate trajectory is affected by a complex traffic situation that is particularly difficult to assess. This also helps to intuitively convey to the user the reference to the query criterion.

If the driver chose one of the visualized candidate trajectories, one embodiment of the present disclosure envisions that a candidate trajectory that the driver has selected as his desired trajectory is visualized as distinct from the other candidate trajectories. This way, the driver receives a visual confirmation for the input of trajectory data, which is conveyed intuitively. For example, candidate trajectories that have not been selected can be visualized by a perforated line in the environmental map, while the selected candidate trajectory is visualized by an uninterrupted line. Visualizations in different colors and/or different line thicknesses in the environmental map can also be used.

In the alternative or in addition, an embodiment provides that the operating device for receiving a route from a vehicle position that is visualized in the environmental map though regions that can be travelled as trajectory data is operated particularly by touching a route on the touchscreen, wherein the desired trajectory is described by the route data. The driver therein ultimately draws his desired trajectory with intention into the environmental map, which also visualizes the current position of the motor vehicle. Ideally, this is achieved by drawing with a finger on a touchscreen. Preferably, the drawn desired trajectory and/or the real trajectory that is derived therefrom is/are visualized for the driver on the display device. It must be noted in this context, naturally, it is sufficient for the driver to indicate a rough guideline for the concrete real trajectory that is to be used in reality by, for example, drawing a route that defines a trajectory class that can be defined by a driving maneuver and/or a route. The driver assistance system is then able to derive and/or use a reasonable, actually drivable real trajectory based on this, preferably after a confirmation input by the driver whereby the visualized desired trajectory that can be derived from the route data in fact corresponds to the intended desired trajectory. Accordingly, it is expediently provided that the route data that is described by the desired trajectory is assigned, considering the environmental model, to a desired driving maneuver and/or a desired route relative to which the real trajectory is determined, respectively optimized for safety and/or comfort.

It must further be noted in this context that, naturally, it is understood that during the method according to embodiments of the present disclosure, while travelling the determined real trajectory, the environmental model is continuously analyzed, particularly, the current sensor data, meaning that the real trajectory can be aborted when an obstacle emerges in the travelling corridor, and the like.

As explained above, designs of radar sensors have become available that are based on semiconductor technology and that enable an extremely exact detection of the environment of the motor vehicle. In particular, a radar sensor with a semiconductor chip, particularly a CMOS chip that implements a radar transceiver can be implemented as a radar sensor and as part of embodiments of the present disclosure. By means of the semiconductor chip of the radar sensor it is also possible to implement a digital signal processing component (DSP) of the radar sensor and/or a control unit of the radar sensor, and/or the semiconductor chip and antenna apparatus of the radar sensor can be implemented as one package. This way, a very miniaturized radar sensor with an excellent signal-to-noise ratio can be implemented that can be used to scan the environment of the motor vehicle with a high level of precision. It is particularly expedient in this context, when a plurality of radar sensors are used whose detection ranges cover the environment of the motor vehicle in a 360° radius. To this end, it is possible to use eight radar sensors; for example, three radar sensors are installed in the front bumper, three in the rear bumper and two laterally, particularly in the doors of the motor vehicle. Wide-angle radar sensors are generally preferred. The radar sensors can preferably be operated at a high-frequency band width that is greater than 1 GHz, preferably 4 GHz, as this results in excellent angular and clearance resolutions. The use of such high-resolution, miniaturized radar sensors on semiconductor basis advantageously facilitates determining the environmental model only with sensor data from the at least one radar sensor. Accordingly, the environmental map is also based solely on the sensor data of the radar sensors.

A further embodiment of the present disclosure provides that the environmental map only visualizes a sub-region of the region that is covered by the environmental model, wherein the size of the sub-region is selected as a function of the current driving situation. Particularly, when the driving situation is not limited only to narrow regions, such as, for example, an adjacent parking space, but, for example, a more complex, large-scale traffic situation, such as a curve or a road section occupied with obstacles, it is possible to visualize larger sub-regions as well.

Aside from a method, the present disclosure also refers to a motor vehicle having at least one radar sensor as an environment sensor and a driver assistance system with a control means that is designed for the implementation of the method according to embodiments of the present disclosure, which can presently be implemented at least in part as a controller. All the comments regarding the method according to embodiments of the present disclosure can be transferred by analogy to the motor vehicle according to embodiments of the present disclosure, wherefore the motor vehicle can serve as well for achieving the previously mentioned advantages.

FIG. 1 shows a flow chart of an embodiment of the method according to embodiments of the present disclosure for operating a driver assistance system, which is presently designed for the completely automated guidance of a motor vehicle along real trajectories. The real trajectories therein are derived from an environmental model that in turn merges the sensor data from different environmental sensors of the motor vehicle in order to describe the overall detected region of the environment of the motor vehicle. The environmental sensors presently comprise a plurality of radar sensors worked in CMOS technology such that the complete environment of the motor vehicle is covered in a 360° radius by the detection regions. This way, it is possible to determine the environmental model solely based on the sensor data of the high-resolution radar sensors; however, it is also conceivable that the sensor data of further environmental sensors are considered, for example, data from cameras. Determining and continuously updating the environmental model is symbolized by step S1 in FIG. 1.

Step S2 symbolizes the normal, usual operation of the driver assistance system without the need for an interaction with a user, i.e. the driver. However, during the operation of the driver assistance system, a query criterion is regularly checked in step S3, and the query criterion essentially indicates as to whether the determination of trajectories can be achieved with the usual, adequate level of quality, when it is based on a, in terms of quality, poorer environmental detection and/or an extremely complex traffic situation. To this end, the query criterion analyzes the operating data that describe the operating state of the environmental sensors, the environmental model in order to evaluate if the environmental detection relative to the determination of the trajectories is incomplete and, finally, output data of a trajectory determination unit for an adequately reliable determination of trajectories. Suitable values, such as confidence values and/or quality values can be compared with threshold values therein.

If the query criterion in step S3 is not met, the usual operation of the driver assistance system in step S2 is continued.

But if the query criterion is met, it is necessary for information from the driver of the motor vehicle to be collected. To this end, first, in step S4, an environmental map is determined that is to be visualized for the driver on the display device, which is here a touchscreen, and which accordingly also comprises an integrated operating device. The environmental map is derived from the environmental model and correspondingly provides a top view of the travelled region and shows based on the environmental model marked regions that can be travelled and regions that cannot be travelled, wherein an embodiment can also envision that regions for which no information is available in the environmental model, which are therefore unknown regions, are visibly and distinctly marked. The environmental map therein can relate to a sub-region of the region covered by the environmental model that can be determined as a function of the current traffic situation and the relevant scale thereof. The environmental map shows, particularly, also the current position and alignment of the motor vehicle, which is the vehicle position. Accordingly, it can be understood as a two-dimensional populated map that the driver can connect intuitively with his own visually perceived environment of the motor vehicle.

One embodiment of the method according to the present disclosure furthermore envisions in step S4 that candidate trajectories are determined in said step S4 and that they are also visualized for the driver as possible selections. Preferably used therein are those trajectories with the best evaluations by the trajectory determination unit, whereby usually different possible driving maneuvers and/or routes can define the classes of the trajectories, wherein there is available one representative candidate trajectory that is optimized relative to security and/or comfort. A criticality value that describes the criticality of travelling along the trajectory for each of these candidate trajectories is determined, which is similarly entered in the visualization that is to be displayed, presently also by means of a color coding, wherein the candidate trajectories having a high criticality value can be visualized in red, candidate trajectories having a moderate criticality value can be visualized in yellow and candidate trajectories having a low criticality value can be visualized in green. Included in the criticality value is also a detection value that is determined in the context of the query criterion, whereby, for example, candidate trajectories that run through regions that are poorly detectable or not detectable at all can be evaluated more critically.

In a step S5, the environmental map and, possibly, the candidate trajectories are visualized on the display device, which is presently the touchscreen, wherein it is also possible to use a touchscreen of a mobile device that is not integrated in the motor vehicle, such as, for example, a driver's smartphone, as a display and operating device, wherein, if this is so, a corresponding communication link exists between the vehicle system and the mobile device. In any case, by interacting with the visualized environmental map and, possibly, the visualized candidate trajectories, the driver can input trajectory data that describe a trajectory that is desired by the driver. To this end, on the one hand, if candidate trajectories are visualized, the driver can interact with the same, for example, by touching a candidate trajectory, to select said trajectory as his desired trajectory. The selected trajectory is then visualized for visual confirmation as distinct from the remaining candidate trajectories.

This is explained in an exemplary manner in the principle-type visualization as seen in FIG. 2 that shows an environmental map 1, which is to be visualized. Hatched areal elements 2 show regions that cannot be travelled, a simplified representation 3 of the motor vehicle and of the current position and alignment of the motor vehicle. Also visible are a plurality of candidate trajectories 4, 5, 6 and 7 that are assigned to the different driving maneuvers and/or routes, which means they are representative for the classes of trajectories. For example, the candidate trajectory 4 describes a left-hand turn, the candidate trajectories 5 and 6 describe the action of driving around an obstacle on the left and/or right side(s), and the candidate trajectory 7 shows a right-hand turn. The candidate trajectory 7 is drawn as a full line, and the candidate trajectories 4, 5 and 6 are drawn as perforated lines, meaning that the driver has selected the candidate trajectory 7.

FIG. 3 shows an embodiment that shows once again the environmental map 1. No candidate trajectories 4 to 7 are presently visualized, although, in principle, it would be conceivable. Using his finger 8, schematically depicted here, and by touching the touchscreen and interacting with the environmental map, the driver has drawn a line on the environmental map 1 whose course reflects the course of his desired trajectory 9 because, relying on his own environmental perception, the driver considers this trajectory his safest option. By route data, the line is described as trajectory data. The desired trajectory 9 that the driver has drawn with his finger 8 along a "stroke" envisions driving around the obstacle located in the center on the left side and nonetheless completing a right turn afterwards. This way, while supporting of the environment sensor means, the driver can prescribe his desired trajectories that emerged due to an only poorly evaluated driving situation or a driving situation that was not evaluated at all in the driver assistance system owing to limited environmental perception of the complex driving situation, even though they represent the most suitable option. The desired trajectory 9 only needs to be prescribed roughly by the "stroke" that generates route data as trajectory data because, although the actual trajectory that is to be travelled (real trajectory) is oriented on the trajectory class, said trajectory is determined in step S6 as optimized in terms of safety and comfort, such that the normal operation of the driver assistance system can be continued in step S2 using the real trajectory that was determined in this manner. In case of preset candidate trajectories, said trajectories can already be optimized for security and comfort, such that the desired trajectory can be directly adopted as a real trajectory, like the candidate trajectory 7 in the example in FIG. 2.

FIG. 4 is a principle sketch of a motor vehicle 10 according to embodiments of the present disclosure. Said motor vehicle includes eight radar sensors 11 that are in total designed as wide-angle radar sensors on CMOS basis, wherefore their detection ranges 12 cover the environment of the motor vehicle 10 in a 360° radius. Three radar sensors each are integrated in a front bumper 13 and/or a rear bumper 14; the two lateral radar sensors 11 are integrated in the doors 15 behind a radar-permeable window.

The radar sensors 11 supply the sensor data to a controller 16 of a driver assistance system 17, wherein the controller 16 is designed as a control device or as a part of a control device for implementing the method according to embodiments of the present disclosure. It is possible therein for the control device to be constituted of a controller 18 of a mobile device 19, which is presently a smartphone 20, whose touchscreen 21 is used as a display device and operating device. It is understood that the motor vehicle 10 can also contain a corresponding combined display and operating device in form of a touchscreen 22 that is connected to the controller 16 and can be used.

FIG. 5 finally shows a concrete embodiment of radar sensors 11 that can be used in the motor vehicle 10. The radar sensor 11 seen there includes a circuit board 24 that is fastened inside the housing 23 for this purpose and that has disposed thereupon a package 27 that implements an antenna arrangement 25 and a semiconductor chip 26, presently a CMOS chip, of the radar sensor 11. Aside from a radar transceiver 28, the semiconductor chip 26 also implements a digital processing component 29 and a controller 30 of the radar sensor 11.

The invention claimed is:

1. A method for operating a driver assistance system of a motor vehicle, wherein the driver assistance system is designed to at least partially automatically guide the motor vehicle, and the motor vehicle has as least one radar sensor as an environment sensor, the method comprising:
  capturing, by the at least one radar sensor, sensor data associated with an environment of the motor vehicle,
  evaluating the sensor data to form an environmental model describing the environment of the motor vehicle,
  responsive to at least one query criterion being satisfied, displaying, by a display device, an environmental map to the driver of the motor vehicle, the environmental map derived from the environmental model, the environmental map illustrating a top view of regions proximate to the motor vehicle,
  during an interaction between the driver and the displayed environmental map, determining, trajectory data describing a desired trajectory of the driver, and guiding the motor vehicle at least partially automatically along a real trajectory derived from the trajectory data, wherein, the displayed environmental map is made possible by an operating device, and wherein the query criterion evaluates operating data that describes an operating state of the at least one environment sensor or the environmental model associated with an incomplete environmental detection relative to the determination of one or more candidate trajectories or output data of a trajectory determination unit for an adequately reliable determination of the one or more candidate trajectories.

2. The method according to claim 1, wherein a touchscreen is used as the display device, or wherein components of a mobile device that is not part of the motor vehicle are used as the display device and the operating device.

3. The method according to claim 2, wherein the environmental model is determined exclusively based on sensor data from the at least one radar sensor.

4. The method according to claim 1, further comprising automatically determining the one or more candidate trajectories, and displaying the one or more candidate trajectories to the driver as marked selections on the environmental map.

5. The method according to claim 4, wherein one representative candidate trajectory is determined, respectively, for different possible driving maneuvers or routes.

6. The method according to claim 4, further comprising determining a criticality value for each candidate trajectory that describes the criticality of driving the trajectory, wherein the display of the candidate trajectories is a function of the criticality value.

7. The method according to any one of the claim 4, wherein a candidate trajectory that the driver selected as the desired trajectory is visualized as distinct from the other candidate trajectory.

8. The method according to claim 1, further comprising receiving, by the operating device, a route that is based on route data from a vehicle position that is visualized in the environmental map as trajectory data, wherein the desired trajectory is determined based on the route data.

9. The method according to claim 8, further comprising assigning a trajectory that is described based on the route data while considering the environmental model to a desired driving maneuver or to a desired route, wherein the real trajectory is optimized in terms of safety and/or comfort.

10. A motor vehicle having at least one radar sensor and one driver assistance system with a control device, the motor vehicle configured to:

capture, by the at least one radar sensor, sensor data associated with an environment of the motor vehicle, evaluate the sensor data to form an environmental model describing the environment of the motor vehicle, responsive to at least one query criterion being satisfied, display, by a display device, an environmental map to the driver of the motor vehicle, the environmental map derived from the environmental model, the environmental map illustrating a top view of regions proximate the motor vehicle, during an interaction between the driver and the displayed environmental map, determine, trajectory data describing a desired trajectory of the driver, and guide the motor vehicle at least partially automatically along a real trajectory derived from the trajectory data, wherein, the displayed environmental map is made possible by an operating device, and wherein the query criterion evaluates operating data that describes an operating state of the at least one environment sensor or the environmental model for an incomplete environmental detection relative to the determination of one or more candidate trajectories or output data of a trajectory determination unit for an adequately reliable determination of the one or more candidate trajectories.

* * * * *